(No Model.) 3 Sheets—Sheet 1.
H. H. SLINN.
CARTRIDGE LOADER.
No. 349,818. Patented Sept. 28, 1886.
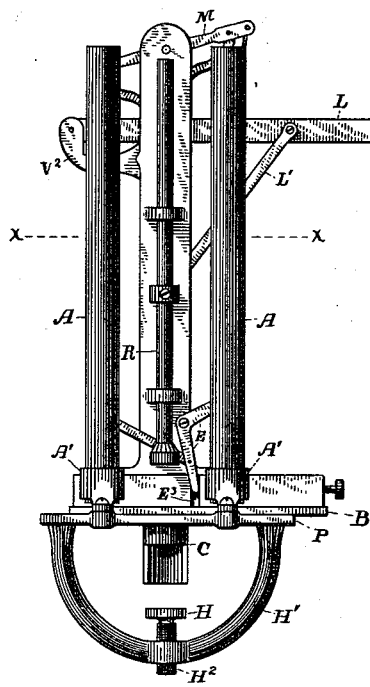
fig. 1.
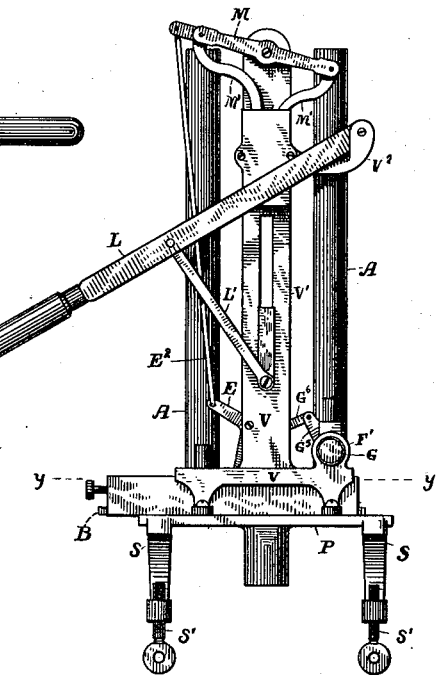
fig. 2.
fig. 3.
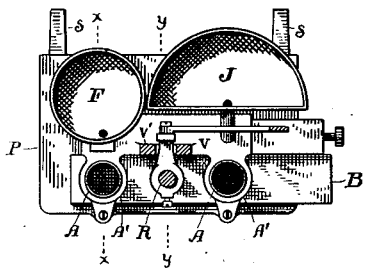
fig. 4.
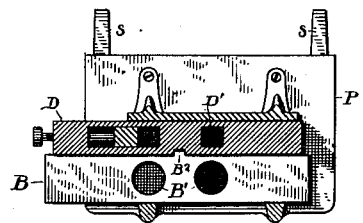
Witnesses:
A. K. Holmes.
A. Keithley
Inventor,
Henry H. Slinn;
by A. B. Upham,
His Attorney.

(No Model.) 3 Sheets—Sheet 2.
H. H. SLINN.
CARTRIDGE LOADER.
No. 349,818. Patented Sept. 28, 1886.
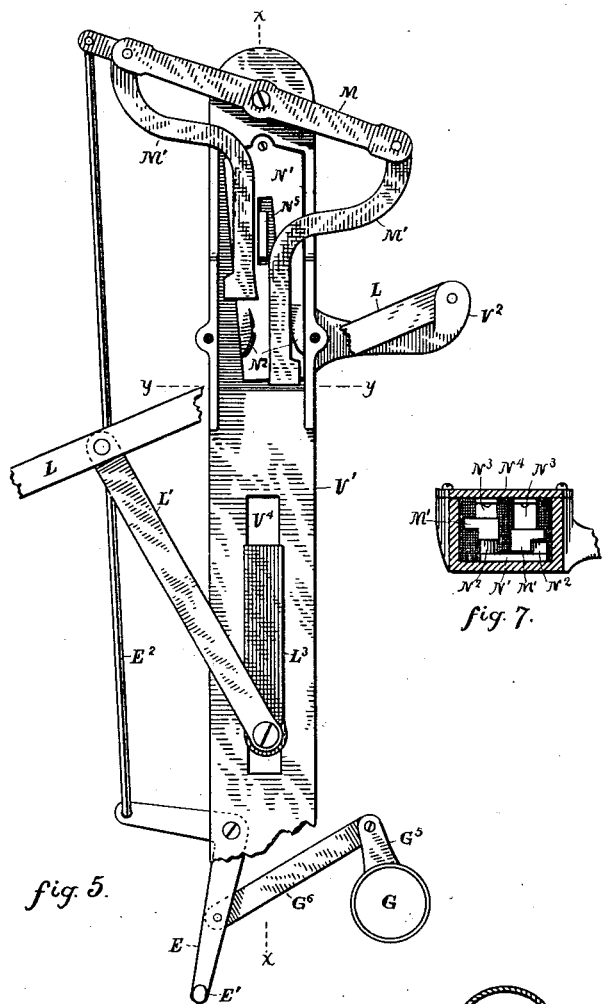
fig. 5.
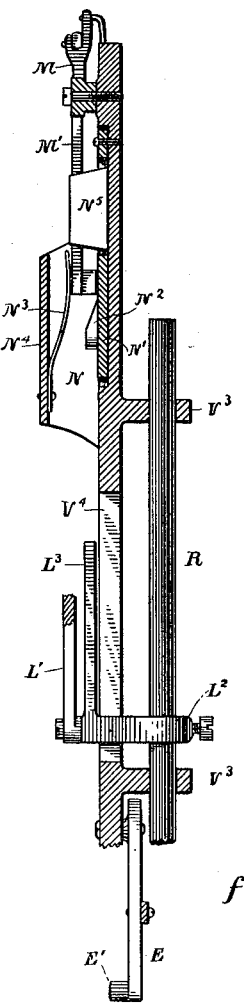
fig. 6.
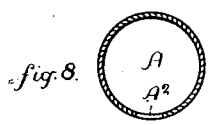
fig. 7.
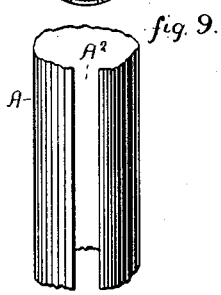
fig. 8.
fig. 9.
Witnesses;
A. H. Holmes.
A. Keithley
Inventor,
Henry H. Slinn,
by A. B. Upham,
His Attorney.

(No Model.) 3 Sheets—Sheet 3.
H. H. SLINN.
CARTRIDGE LOADER.
No. 349,818. Patented Sept. 28, 1886.
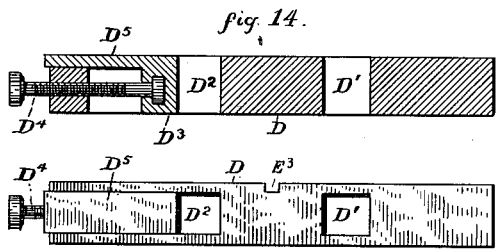
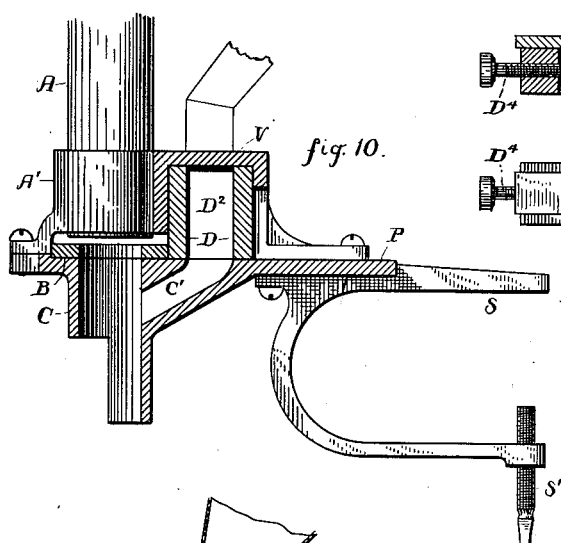
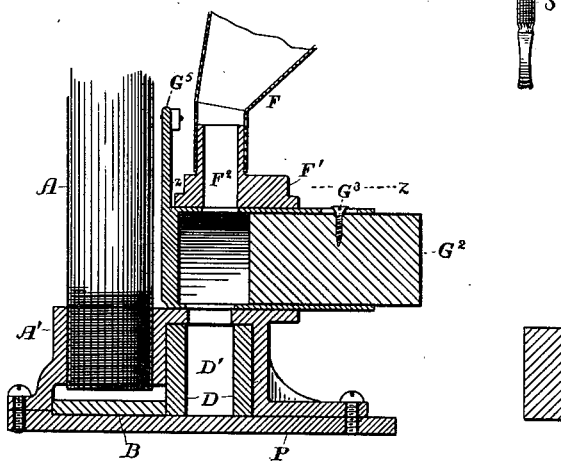
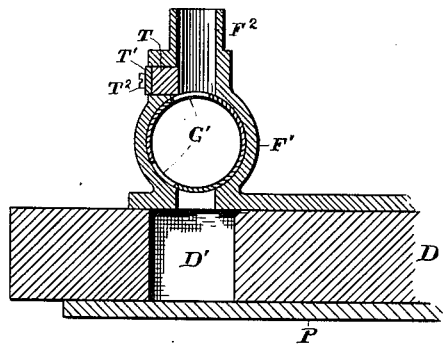
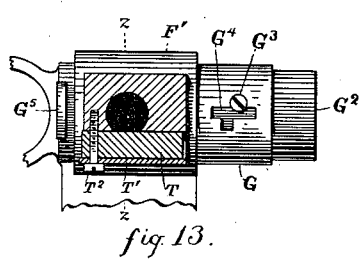
Witnesses:
A. M. Holmes.
A. Keithley
Inventor,
Henry H. Slinn;
by A. B. Upham,
His Attorney.

UNITED STATES PATENT OFFICE.

HENRY H. SLINN, OF CHILLICOTHE, ILLINOIS.

CARTRIDGE-LOADER.

SPECIFICATION forming part of Letters Patent No. 349,818, dated September 28, 1886.

Application filed September 28, 1885. Serial No. 178,389. (No model.)

*To all whom it may concern:*

Be it known that I, HENRY H. SLINN, of Chillicothe, in the county of Peoria, in the State of Illinois, have invented an Improved Cartridge-Loader; and I do hereby declare that the following is a full, clear, and exact description thereof, reference being had to the annexed drawings, making a part of this specification, in which like letters of reference refer to like parts, and in which—

Figure 1 represents a front elevation of the same; Fig. 2, a rear elevation; Fig. 3, a sectional plan view at X X in Fig. 1; Fig. 4, a sectional plan view at Y Y in Fig. 2; Fig. 5, a detail view of the slide-moving mechanism; Fig. 6, a section through X X in Fig. 5; Fig. 7, a section at Y Y in Fig. 5; Figs. 8 and 9, sectional and side views of the wad-tube; Fig. 10, a section at Y Y in Fig. 3; Fig. 11, a section at X X in Fig. 3; Fig. 12, a section at Z Z in Fig. 13; Fig. 13, a section at Z Z in Fig. 11; Figs. 14 and 15, plan and section of slide B.

The object of this invention is the construction of a compact machine for enabling a person to load rapidly and automatically the shells that are used in breech-loading shot-guns. In the construction which I have devised for this purpose the operator simply uses one hand to insert empty shells and remove loaded ones, and the other hand to oscillate the actuating-lever. All the other steps in the process are performed automatically by means of the machine, which consists of the following elements: first, the shell-holder and the delivery-spout; second, the wad-tubes and the slide for conveying the wads to said delivery-spout; third, to the powder-reservoir and shot-reservoir, and means for conveying the contents thereof, when required, to the delivery-spout; and, fourth, to the rammer for forcing firmly into the shell the wads and the powder and shot.

In the drawings, P is the foundation-plate of the device, S S are the clamping-jaws, and S' the set-screws for securing the plate to a table or other place at which it is desired to use the loader. Below said plate extends the stirrup H', having the shell-holder H secured thereto, which is vertically adjustable by means of its screw-threaded stem H² turning in a screw-threaded eye in said stirrup. Vertically over said shell-holder is the delivery-spout C, the opening through which is extended up through said plate P. The back half of the delivery-spout is prolonged downward to furnish a back rest for the shell placed upon the shell-holder H. Concentric with said delivery-spout is the cartridge-rammer R, vertically movable in suitable ways and actuated by means of the lever L, joined thereto by the connecting-rod L'. The wad-tubes A A are vertically secured at equal distances from the delivery-spout C by being screwed into the collars A', fixed to the plate P. First, however, I should explain that the wads are formed by being stamped or otherwise cut from sheets of the suitable material of the proper thickness, and are of a discous shape, of a diameter slightly greater than that of the interior of the shells. Within said tubes A these wads are placed, lying flatly one upon another, until said tubes are about full, and in case some of the wads get turned on edge when inserted in the tubes said tubes A have one or more elongated openings made through the side of each. This permits of the introduction of the finger or any suitable tool, and such turned wads to be righted thereby. In Figs. 8 and 9 a portion of a tube, A, is shown with a slot, A², through the side thereof.

To convey the wads from the tubes A is the work of the slide B. This slide B, having two holes through it equal in diameter to the wads and at a distance apart equal to the distance apart of the delivery-spout C and either tube A, is adapted to be moved back and forth upon the plate P over the discharge-spout C. By means of the hereinafter-described mechanism said slide is arranged to have a longitudinal stroke equal in length to the distance apart of the centers of its openings B', and such stroke being made to terminate at each end with one opening B' coincidently over the delivery-spout C and the other opening exactly under one of the tubes A, a wad that drops into one opening B' from the tube A above the same is carried by the succeeding stroke to the delivery-spout C. At this point the rammer R is adapted to descend, and, encountering the said wad, pushes the same before it down through the delivery-spout into the shell, which is held beneath on the shell-holder H. The lower ends of the tubes A being but a short distance above the slide B, no wads can be displaced from said tubes except when the openings B' are in line beneath the same. When said openings are away from the tubes, the wads rest upon the slide B. The tubes A, being screwed into the collars A', can be adjusted toward or from the slide B by turning them more or less, and they can thereby be adapted for different thicknesses of wads.

In loading cartridges it is customary to first insert the proper quantity of powder into the shell, then ram in a wad, then the shot, and, finally, a second wad. I have therefore to convey at the exact time to the delivery-spout C the powder and the shot. To do this I have a second slide, D, arranged to move simultaneously with the slide B, and having two openings, D', through it, but of a considerably greater vertical thickness. As this slide D is just behind the slide B, the powder and shot reservoirs F and J are placed behind the tubes A, and are adapted to introduce their contents into the openings D' D² of the slide D through the channels F² J² of the bridge V, that holds said slide. Behind the delivery-spout C, in line with the center of the slide D, which I shall call the "ammunition-slide," is a channel, C', leading down to the delivery-spout C. Through this channel runs the powder and shot to said delivery-spout from the ammunition-slide before the rammer R has time to bring the wad down into the shell. In Fig. 10 is shown the channel C', opening just below the slide D.

The construction of the ammunition-slide D is as follows: The opening D' through the same is for the shot, and is made large enough to accommodate the largest load of shot which it may ever be desired to insert in a shell. The other opening, D², is for the powder, and is made adjustable for varying quantities of the explosive by means of the movable partition D³. The screw D⁴, projecting out through the end of the slide D, enables said partition to be suitably removed and the opening D² to be enlarged or contracted. Figs. 14 and 15 show this slide D in plan and horizontal section. Directly over the powder-opening D², when that end of the slide is at its outer extremity of stroke, there projects from the bridge V the perforated nozzle J². To this nozzle joins the funnel-shaped bottom of the powder-reservoir J. Now, therefore, when the slide D is at this position of stroke, the powder at once fills the opening D². As the slide is moved to its opposite position of stroke, the powder contained in the opening D² is moved along therein to the channel C' wherein it is at once dumped when reached. The unbroken top of the rest of the slide D between the opening D² and the extremity of said slide coming beneath the aperture through the nozzle J², closes the same and prevents the further outflow of powder until the opening D² is again moved below said nozzle. The shot cannot be measured in the opening D', as is the powder in the powder-opening D², on account of the likelihood of the bits of metal becoming caught between the approaching edges of the opening and the aperture of the supply-nozzle, and thereby either stopping the stroke of the slide or breaking some portion of the mechanism. To provide a suitable cut-off for the shot I introduce the oscillatory cylinder G between the shot-reservoir F and the slide D. This cut-off consists of the cylinder G, having the hereinafter-described means for oscillating it in the vertically-apertured case F'. Through the side of said cylinder G, at points not diametrically opposite, are the shot inlet and outlet holes G'. As shown in Fig. 12, said holes G' are so situated that when the cylinder G is turned at one angle the shot can enter from the shot-reservoir above, but cannot pass out through the outlet-hole until said cylinder is given an opposite turn, when the lower hole is made to coincide with the passage from the case F' to the opening D'. At the same instant, however, the inlet-hole G' is closed and no more shot allowed to enter the cylinder G while the same is being emptied. To prevent the shot from clogging between the edge of the inlet-hole G' and the edge of the passage F², I cut away the latter edge and insert thereat the rubber edge-piece T, held in place by the metal spring T' and screw T². The capacity of the cylinder is varied by the plug G² and screw G³.

The mechanism for actuating the slides D and B and the cut-off G is as follows: The rammer R is reciprocated by means of the connecting-rod L' joining it to the lever L, which by its oscillation gives the desired movement to said rammer. The lever L is pivoted to a projection, V², of the post V', rising from the bridge V. The rammer R is movable in the bearings V³, projecting from said post V', and through the slot V⁴ in said post passes the rear end of the collar L², fixed on said rammer R. To this rear end of said collar is pivoted the lower end of the connecting-rod L', by which the oscillation of said lever L reciprocates said rammer R. To enable the last part of the upper stroke of the rammer R to move the slide D and the slide B, connected therewith, is the object of the following construction. Pivoted at its center to the upper end of the post V' is the rocking lever M, from the ends of which depend the pawls M', so bent that their lower ends lie in the chamber N, formed on the post V'. (See Figs. 2, 5, and 6.) As one of said pawls is pushed up the other of course moves down. To give the upward push to these pawls is the office of the finger L³, projecting up from the rear end of the collar L². It is, however, evident that as said finger is pushing one pawl upward the other will in its descent come in contact with said finger and the movement stopped. To overcome this defect I adapt the descending pawl to ride over the impelling-finger. This I do by means of the rocking plate N', pivoted at its upper end to the post V', and provided with the two lugs N². These lugs are so arranged and the feet of the pawls M' are so shaped that as one pawl is rising it comes in contact with one lug N², and so shifts the plate N' that the other lug N² moves into the path of the thick portion of the foot of the descending pawl, and wedges it away from the plate N' far enough to permit the ascending finger to pass behind it and continue raising the ascending pawl the required length of stroke. Springs N³, affixed to the wall N⁴ of the chamber N, keep the pawls M' impressed against the plate N'. The descent of the finger L³ leaves the pawls M' in the position which is reversed with its succeeding upward stroke. The narrow lug N⁵, projecting from the post V' through a suitable slot in the plate N', separates the two pawls M'. The intermittent oscillation of the rock-lever M communicates the required intermittent reciprocation to the slides D and B through the rod E², pivoted to one end of said lever M and to the bell-crank lever E, at the end of the lower arm of which is the lug E', projecting into the groove E³ of the slide D. The slide B moves with the slide D by means of the lug B², projecting from the edge of said slide B and entering said groove E³. The movement of the cut-off cylinder G is obtained by means of the arm G⁵, projecting from said cylinder, and the link G⁶, joining said arm to the lower arm of the bell-crank lever E. I design, by means of a spiral spring about the rammer R, to thereby adapt said rammer to raise itself until the finger L³ almost touches the pawls M', so that all the operator is obliged to do is to give a short upward pull to the lever L sufficient to move the slides, and then press the same down for the ramming stroke.

As not previously sufficiently described, the adjusting of the capacity of the cut-off cylinder G is done by means of the plug G², easily movable in said cylinder. Through the side of the cylinder is the four-armed slot G⁴, through which passes the screw G³ into said plug. By unloosening said screw and turning and pushing or pulling slightly said plug the capacity of the cylinder can be given the desired change, suitable figures indicating the various capacities.

In using my cartridge-loader an empty shell is placed upon the shell-holder H, the lever L is given an upward push to throw the powder-opening of the slide D to the channel C', a wad is brought by the slide B over the delivery-spout C, and the powder having poured from the ammunition-slide D through the channel C' to the delivery-spout C, and from thence down into the shell, the lever L is depressed, and the rammer R meets the suspended wad and forces it down through the delivery-spout into the shell and upon the powder therein. The lever L is now raised until the slides are reversed, a new wad is brought to the delivery-spout, the shot has been conveyed to the channel C' and has poured through the same into the shell, and again the rammer R is depressed, and the wad is forced into the shell upon the shot. The lever being now suffered to rise by the resilience of the coiled spring about the rammer, the cartridge is removed, an empty one substituted therefor, and the same operation gone through with for its loading.

In case it is desired to ram two wads instead of one upon the shot, a slide, B, only half as long as the other can be placed upon the same so that their openings B' coincide beneath one wad-tube. The wad-tube would have to be elevated sufficiently to give a vertical space between its end and the plate P equal to the height of two superimposed wads. In this way the doubled end of the slide B brings two wads to the delivery-spout and the single end brings but one wad.

What I claim as my invention, and for which I desire Letters Patent, is as follows, to wit:

1. In a cartridge-loader, the combination of the rammer, the ammunition-slide, the actuating-lever having the connecting-rod joining it to said rammer, the finger projecting from said rammer, the rocking lever, the pawls depending from said rocking lever and adapted to be actuated by said finger, substantially as described, the bell-crank lever engaging with said ammunition-slide, and a link connecting said bell-crank lever and rocking lever, substantially as set forth.

2. In a cartridge-loader, the combination, with the post, the rammer, and the finger projecting from said rammer parallel thereto, of the rocking lever centrally pivoted to said post, the pawls M', depending from said rocking lever and having their lower ends shaped as described, the chamber N on said post, the plate N', pivoted at its upper end in said chamber and having the lugs N², and the springs for pressing said pawls against said plate, substantially as and for the purpose specified.

3. The combination, with the foundation-plate, the post projecting therefrom, and the rocking lever pivoted to the upper end of said post, of the ammunition-slide movable upon said plate and having the groove in a side thereof, the bell-crank lever pivoted to said post and having the lug entering said groove, and a link joining said bell-crank lever and rocking lever, substantially as and for the purpose specified.

4. In a cartridge-loader, the combination of the ammunition-slide having the groove in the side thereof, the wad-slide having the lug projecting from its edge into said groove, the bell-crank lever having the lug entering said groove, the rocking lever, and a link joining said bell crank-lever and rocking lever, substantially as described.

5. In a cartridge-loader, the combination, with the ammunition-slide and the bell-crank lever actuating said slide, of the oscillating cylinder having peripheral openings and an arm joined to said bell-crank lever, the plug removable in an end of said cylinder, and the set-screw for adjusting the same therein, as set forth.

6. In a cartridge-loader, the combination, with the peripherally-apertured oscillating cylinder, of the case enveloping said cylinder and having the passage leading from the shot-reservoir, and the passage leading to the ammunition-slide, and the lateral opening to the former of said passages, the rubber cut-off inserted into said lateral opening, and the spring and its screw for pressing said cut-off to its place, as set forth.

7. In a cartridge-loader, the combination, with the foundation-plate and the post projecting therefrom, of the rammer vertically movable in ways connected with said post, the finger $L^3$, affixed to said rammer, the rocking lever M, centrally pivoted to the upper end of said post, the pawls M', depending from said rocking lever and having their lower ends movable in the chamber N, formed on said post and shaped as described, the plate N', pivoted at its upper end in said chamber and having the lugs $N^2$ at its lower end, and the springs for pressing said pawls against said plate, substantially as and for the purpose set forth.

In testimony that I claim the foregoing as my invention I have hereunto set my hand this 27th day of August, 1885.

HENRY H. SLINN.

In presence of—
A. KEITHLEY,
A. B. UPHAM.